United States Patent [19]

Fogel

[11] Patent Number: 5,710,812

[45] Date of Patent: Jan. 20, 1998

[54] TELEPHONE CORD ANTI-TWISTING DEVICE

[76] Inventor: Matthew A. Fogel, 1553 Roma Dr., Vista, Calif. 92083-5031

[21] Appl. No.: 659,286

[22] Filed: Jun. 6, 1996

[51] Int. Cl.⁶ .................................................. H04M 1/00
[52] U.S. Cl. ............................................................ 379/438
[58] Field of Search ................................ 379/438, 437, 379/449; 174/69, 120 R, 36

[56] References Cited

U.S. PATENT DOCUMENTS

| 1,708,165 | 4/1929 | Willat | 174/69 |
| 4,646,987 | 3/1987 | Peterson | 379/438 |

FOREIGN PATENT DOCUMENTS

| 59-161963 | 9/1989 | Japan | 379/438 |
| 1-311653 | 12/1989 | Japan | 379/449 |

*Primary Examiner*—Jack Chiang

[57] ABSTRACT

A telephone cord anti-twisting device including a phone cord having a first end coupled with a base of a telephone. A second end of the phone cord is coupled with a handset of the telephone. The phone cord can retract when not in use either by retracting onto a reel or be formed into concentric rings to allow the cord to be stacked neatly when not in use.

1 Claim, 3 Drawing Sheets

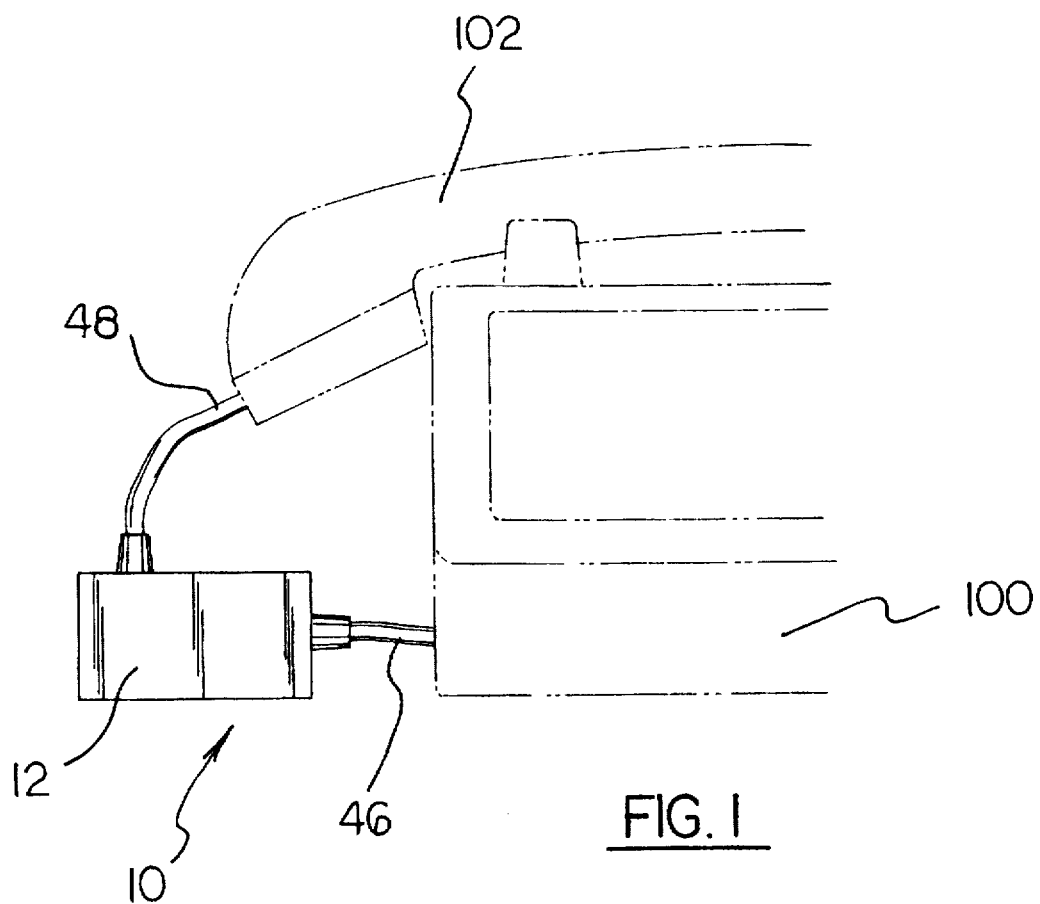
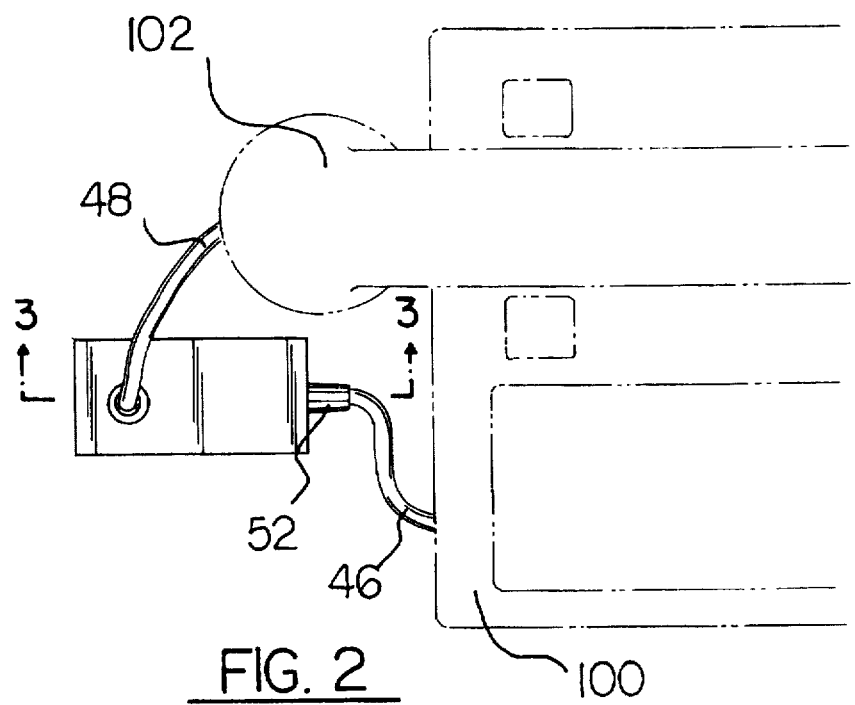

TELEPHONE CORD ANTI-TWISTING DEVICE

BACKGROUND OF THE INVENTION

1. Field of the Invention

The present invention relates to a telephone cord anti-twisting device and more particularly pertains to preventing twisting of a telephone cord with a telephone cord anti-twisting device.

2. Description of the Prior Art

The use of telephone cord protectors is known in the prior art. More specifically, telephone cord protectors heretofore devised and utilized for the purpose of protecting telephone cords are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,679,234 to Earwood Sr. discloses a telephone cord twist restrainer.

U.S. Pat. No. 4,313,645 to Cocco discloses a telephone cord having braided outer jacket.

U.S. Pat. No. Des. 306,999 to Moore et al. discloses the ornamental design for a marked retractile telephone cord.

U.S. Pat. No. 4,939,778 to Tomberlin discloses a telephone cord cover.

U.S. Pat. No. 4,592,955 to Choi et al. discloses an insulating covering for strand material.

U.S. Pat. No. 4,227,042 to Lueddecke et al. discloses telephone cords.

While these devices fulfill their respective, particular objective and requirements, the aforementioned patents do not describe a telephone cord anti-twisting device for preventing twisting of a telephone cord.

In this respect, the telephone cord anti-twisting device according to the present invention substantially departs from the conventional concepts and designs of the prior art, and in doing so provides an apparatus primarily developed for the purpose of preventing twisting of a telephone cord.

Therefore, it can be appreciated that there exists a continuing need for new and improved telephone cord anti-twisting device which can be used for preventing twisting of a telephone cord. In this regard, the present invention substantially fulfills this need.

SUMMARY OF THE INVENTION

In the view of the foregoing disadvantages inherent in the known types of telephone cord protectors now present in the prior art, the present invention provides an improved telephone cord anti-twisting device. As such, the general purpose of the present invention, which will be described subsequently in greater detail, is to provide a new and improved telephone cord anti-twisting device and method which has all the advantages of the prior art and none of the disadvantages.

To attain this, the present invention essentially comprises a housing having a generally rectangular configuration. The housing has an upper end, a lower end, a pair of long side ends and a pair of short side ends. The housing has a chamber therein. The device includes a reel comprised of a hollow elongated shaft with circular members fixedly secured on opposing ends thereof. Each of the circular members has a protrusion extending outwardly therefrom to rotatably couple the reel within the chamber of the housing. A retracting spring is coupled with one of the protrusions. The retracting spring has a free end secured to a lower surface of the chamber. The reel has an opening extending through one of the protrusions into the elongated shaft. The elongated shaft has an opening through a side wall thereof. The device includes a phone cord having a first end coupled with a base of a telephone. A second end of the phone cord extends through an entrance aperture in one of the short side ends of the housing into the opening in the reel and extends through the elongated shaft outwardly of the opening in the side wall of the shaft and wraps around the shaft and extends through an exit aperture in the upper end of the housing to couple with a handset of the telephone. A pair of anti-twist adapters are secured to the entrance aperture and the exit aperture for receiving the phone cord therethrough.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved telephone cord anti-twisting device which has all the advantages of the prior art telephone cord protectors and none of the disadvantages.

It is another object of the present invention to provide a new and improved telephone cord anti-twisting device which may be easily and efficiently manufactured and marketed.

It is a further object of the present invention to provide a new and improved telephone cord anti-twisting device which is of durable and reliable construction.

An even further object of the present invention is to provide a new and improved telephone cord anti-twisting device which is susceptible of a low cost of manufacture with regard to both materials and labor, and which accordingly is then susceptible of low prices of sale to the consuming public, thereby making such a telephone cord anti-twisting device economically available to the buying public.

Still yet another object of the present invention is to provide a new and improved telephone cord anti-twisting device which provides in the apparatuses and methods of the prior art some of the advantages thereof, while simultaneously overcoming some of the disadvantages normally associated therewith.

Even still another object of the present invention is to provide a new and improved telephone cord anti-twisting device for preventing twisting of a telephone cord.

Lastly, it is an object of the present invention to provide a new and improved telephone cord anti-twisting device including a phone cord having a first end coupled with a base of a telephone. A second end of the phone cord is coupled with a handset of the telephone. The phone cord can retract when not in use either by retracting onto a reel or be formed into concentric rings to allow the cord to be stacked neatly when not in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of the preferred embodiment of the telephone cord anti-twisting device constructed in accordance with the principles of the present invention.

FIG. 2 is a plan view of the present invention as coupled with a telephone.

The same reference numerals refer to the same parts through the various Figures.

DESCRIPTION OF THE PREFERRED EMBODIMENT

Figure 3:
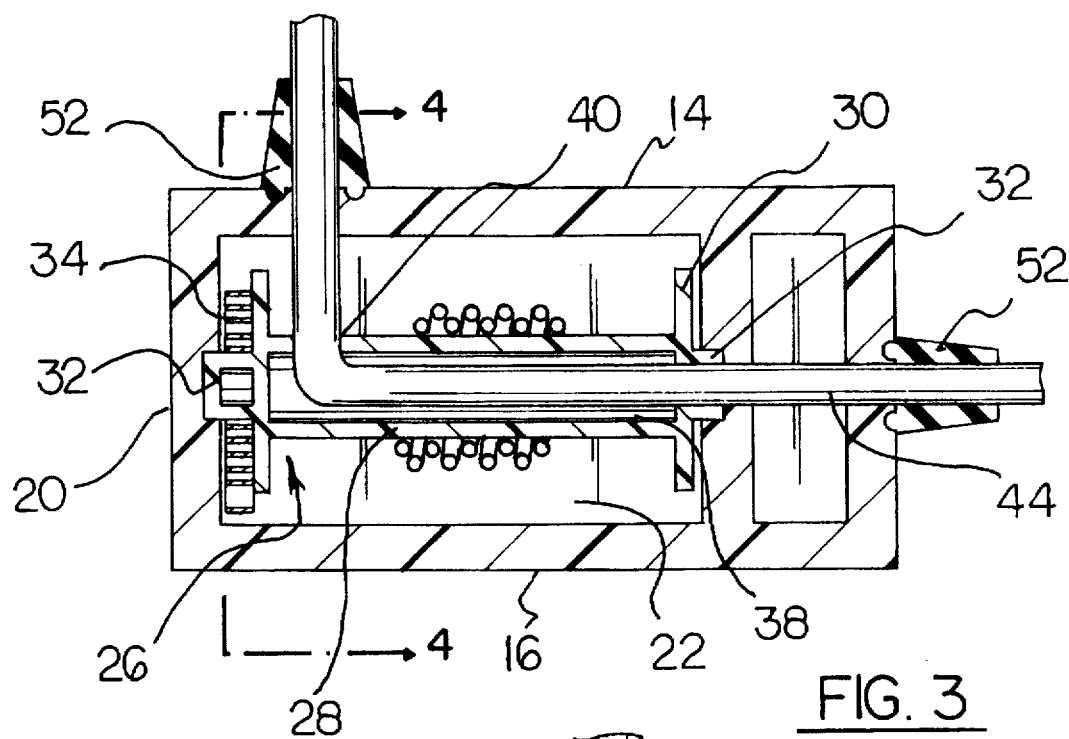
FIG. 3 is a cross-sectional view as taken along line 3—3 of FIG. 2.
Figure 4:
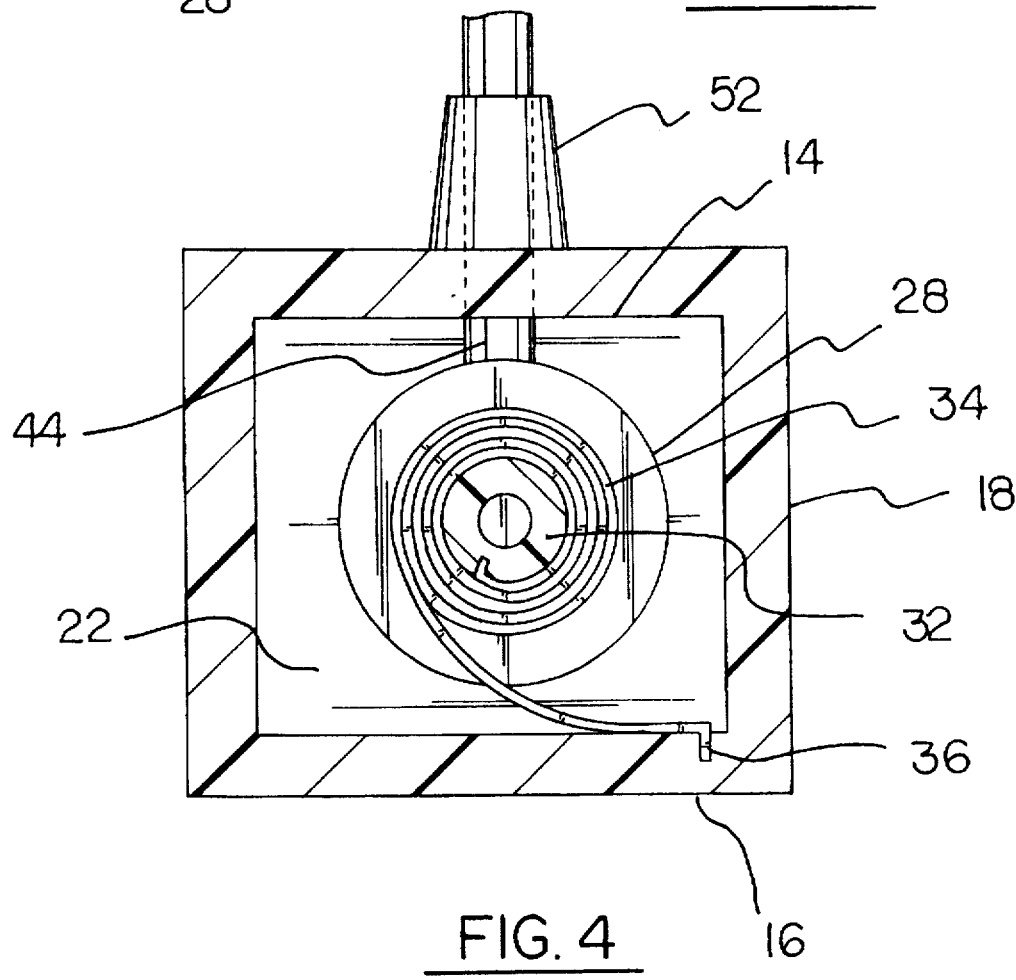
FIG. 4 is a cross-sectional view as taken along line 4—4 of FIG. 3.

With reference now to the drawings, and in particular, to FIGS. 1-6 thereof, the preferred embodiment of the new and improved telephone cord anti-twisting device embodying the principles and concepts of the present invention and generally designated by the reference number 10 will be described.

Specifically, it will be noted in the various Figures that the device relates to a telephone cord anti-twisting device for preventing twisting of a telephone cord. In its broadest context the device consists of a housing, a reel, a phone cord and a pair of anti-twist adapters. Such components are individually configured and correlated with respect to each other so as to attain the desired objective.

The device 10 includes a housing 12 having a generally rectangular configuration. The housing 12 has an upper end 14, a lower end 16, a pair of long side ends 18 and a pair of short side ends 20. The housing 12 has a chamber 22 therein. The housing 12 would have a size dictated by the size of the reel therein. The chamber 22 has a pair of protruded areas on opposing ends thereof to serve as mounting points for the reel.

The device 10 includes a reel 26 comprised of a hollow elongated shaft 28 with circular members 30 fixedly secured on opposing ends thereof. Each of the circular members 30 has a protrusion 32 extending outwardly therefrom to rotatably couple the reel 26 within the chamber 22 of the housing 12. A retracting spring 34 is coupled with one of the protrusions 32. The retracting spring 34 has a free end 36 secured to a lower surface of the chamber 22. The reel 26 has an opening 38 extending through one of the protrusions 32 into the elongated shaft 28. The elongated shaft 28 has an opening 40 through a side wall thereof. The reel 26 is preferably constructed of a rigid plastic material.

The device 10 also includes a phone cord 44 having a first end 46 coupled with a base 100 of a telephone. A second end 48 of the phone cord 44 extends through an entrance aperture in one of the short side ends 20 of the housing 12 into the opening 38 in the reel 26 and extends through the elongated shaft 28 outwardly of the opening 40 in the side wall of the shaft 28 and wraps around the shaft 28 and extends through an exit aperture in the upper end 14 of the housing 12 to couple with a handset 102 of the telephone. In use, as the user of the telephone walks away from the base 100, the phone cord 44 unwinds from the reel 26. When the user is finished with the telephone and walks back towards the base 100, the retracting spring 34 will cause the reel 26 to rotate thereby wrapping the phone cord 44 around the shaft 28.

A pair of anti-twist adapters 52 are secured to the entrance aperture and the exit aperture for receiving the phone cord 44 therethrough. The adapters 52 are used to allow for flexing and turning of the phone cord 44. The adapters 52 act as a shock absorber when the phone cord 44 is turned from side to side or up and down during use. The adapters 52 consist of a ribbed external surface that is conical with its larger end against each exterior surface of the housing 12.

Figure 5:
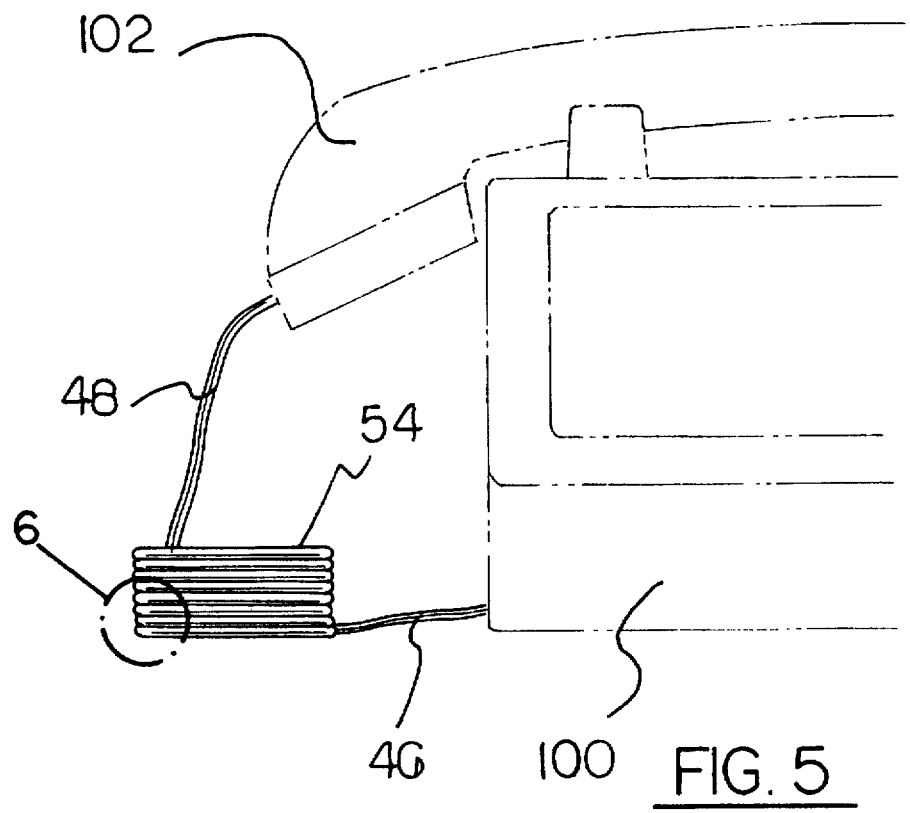
FIG. 5 is a front view of a second embodiment of the present invention.
Figure 6:
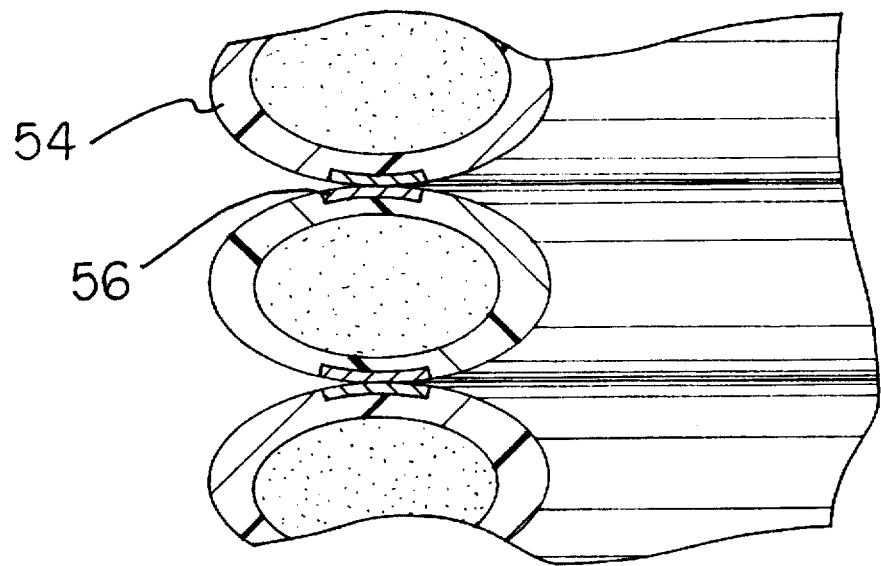
FIG. 6 is an enlarged sectional front view of the second embodiment taken along circle 6 of FIG. 5.

A second embodiment of the present invention is shown in FIGS. 5 and 6 and includes substantially some of the components of the present invention wherein an intermediate extent of the phone cord 44 is comprised of a plurality of concentric rings 56. Magnets 58 are disposed on upper and lower surfaces of each of the concentric rings 56. A magnet 56 disposed on the upper surface of each concentric ring 54 has a polarity and a magnet 56 on the lower surface of each ring 54 has an opposite polarity. Thus a user extending the handset 102 away from the base will sequentially release the concentric rings 54 whereupon returning the handset 102 to the base 100 will cause the magnets 56 to attract to each other thereby stacking the rings in a cylindrical configuration next to the base 100.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A telephone anti-twisting device comprising:
a phone cord having a first end coupled with a base of a telephone, a second end of the phone cord coupled with a handset of the telephone, the phone cord having means for retractability, an intermediate extent of the phone cord comprised of a plurality of separable concentric rings in a stacked configuration when fully retracted, the means for retractability further including magnets disposed on upper and lower surface of each of the concentric rings, the magnet disposed on the upper surface of each concentric ring having a first polarity and the magnet of the lower surface of each concentric ring having a second polarity wherein the first polarity is opposite of the second polarity.

* * * * *